(12) United States Patent
Tomescu et al.

(10) Patent No.: US 11,585,272 B2
(45) Date of Patent: Feb. 21, 2023

(54) SYSTEM AND METHOD FOR DETECTION OF EXCESSIVE FLOW IN A FLUID SYSTEM

(71) Applicant: PRATT & WHITNEY CANADA CORP., Longueuil (CA)

(72) Inventors: Dana Tomescu, Brampton (CA); Nick Stina, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 321 days.

(21) Appl. No.: 16/912,566

(22) Filed: Jun. 25, 2020

(65) Prior Publication Data
US 2021/0404383 A1    Dec. 30, 2021

(51) Int. Cl.
| | | |
|---|---|---|
| G01F 1/696 | (2006.01) |
| F02C 7/12 | (2006.01) |
| F02C 7/141 | (2006.01) |
| F02C 7/00 | (2006.01) |
| G01M 3/32 | (2006.01) |
| F01D 9/06 | (2006.01) |
| F01D 21/12 | (2006.01) |
| F01D 25/20 | (2006.01) |
| G01M 3/00 | (2006.01) |
| F01D 21/00 | (2006.01) |

(Continued)

(52) U.S. Cl.
CPC ............... *F02C 7/141* (2013.01); *F02C 7/12* (2013.01); *G01F 1/696* (2013.01)

(58) Field of Classification Search
CPC .... F02C 7/141; F02C 7/12; F02C 7/00; F02C 9/00; G01F 1/696; G01M 3/3227; G01M 3/002; F05D 2260/98; F05D 2270/301; F05D 2270/303; F01D 9/065; F01D 21/12; F01D 25/20; F01D 21/003; F02B 77/08; F02B 77/089; F15B 19/005; F15B 20/005
See application file for complete search history.

(56) References Cited

U.S. PATENT DOCUMENTS

| | | |
|---|---|---|
| 3,738,154 A | 6/1973 | Henry |
| 6,119,710 A | 9/2000 | Brown |

(Continued)

FOREIGN PATENT DOCUMENTS

| | | |
|---|---|---|
| EP | 2615432 | 7/2013 |
| GB | 2533936 | 7/2016 |

(Continued)

OTHER PUBLICATIONS

Extended European Search Report dated Jan. 19, 2022, in counterpart EP application No. 21180960.3.

*Primary Examiner* — Herbert K Roberts
*Assistant Examiner* — Anthony W Megna Fuentes
(74) *Attorney, Agent, or Firm* — Norton Rose Fulbright Canada LLP

(57) ABSTRACT

There is provided a system and method for detecting excess flow in an engine fluid system, the method comprising sensing a temperature of a fluid flowing in a fluid line of the fluid system, the fluid line located downstream of a fluid flow restrictor configured to receive the fluid from a source upstream thereof and to flow the fluid from the source into the fluid line downstream thereof, comparing the temperature to a temperature threshold, and when the temperature is beyond the temperature threshold, detecting excess flow of the fluid in the fluid line and outputting an excess flow indication accordingly.

16 Claims, 8 Drawing Sheets

(51) Int. Cl.
    *F02B 77/08*     (2006.01)
    *F02C 9/00*     (2006.01)
    *F15B 19/00*     (2006.01)
    *F15B 20/00*     (2006.01)

(56) References Cited

U.S. PATENT DOCUMENTS

| | | |
|---|---|---|
| 6,422,220 B1 | 7/2002 | Lepp |
| 7,474,968 B2 | 1/2009 | Ding et al. |
| 10,031,004 B2 | 7/2018 | Ding et al. |
| 2013/0174649 A1* | 7/2013 | Hains .................. G01M 3/3227 73/40.5 R |
| 2014/0046605 A1 | 2/2014 | McHugh et al. |

FOREIGN PATENT DOCUMENTS

| | | | | |
|---|---|---|---|---|
| GB | 2546126 A | * | 7/2017 | ............... G01F 1/68 |
| KR | 20180078049 A | * | 7/2018 | |

* cited by examiner

SYSTEM AND METHOD FOR DETECTION OF EXCESSIVE FLOW IN A FLUID SYSTEM

TECHNICAL FIELD

The application relates generally to engine fluid systems, and, more particularly, to detecting excessive flow in engine fluid systems.

BACKGROUND OF THE ART

In an engine fluid system, excessive flow in a fluid line can be caused by a disconnected or loose fluid connection, which can result from a missed maintenance or assembly operation. Excessive fluid flow can also be caused by a fracture of the fluid line (e.g., a break in a tube in the engine's pneumatic system), which can be a critical failure mode. It is therefore desirable to detect these failures in an efficient manner. Existing methods of monitoring fluid flow in an engine fluid system can however prove complex. As such, there is room for improvement.

SUMMARY

In one aspect, there is provided a method for detecting excess flow in an engine fluid system, the method comprising sensing a temperature of a fluid flowing in a fluid line of the fluid system, the fluid line located downstream of a fluid flow restrictor configured to receive the fluid from a source upstream thereof and to flow the fluid from the source into the fluid line downstream thereof, comparing the temperature to a temperature threshold, and when the temperature is beyond the temperature threshold, detecting excess flow of the fluid in the fluid line and outputting an excess flow indication accordingly.

In some embodiments, upon excess fluid flow being supplied into the fluid line, the fluid flow restrictor is configured to create a choked flow thereat and to cause a decrease in the temperature downstream of the fluid flow restrictor.

In some embodiments, the fluid flow restrictor is a venturi nozzle.

In some embodiments, sensing the temperature comprises sensing the decrease in the temperature downstream of the fluid flow restrictor.

In some embodiments, sensing the temperature comprises obtaining a measurement of the temperature from a temperature sensor positioned downstream of the fluid flow restrictor.

In some embodiments, sensing the temperature comprises sensing the temperature of the fluid flowing in a primary fluid line of the fluid system.

In some embodiments, sensing the temperature comprises sensing the temperature of the fluid flowing in a secondary bypass fluid line of the fluid system, the secondary bypass fluid line parallel to a primary fluid line of the fluid system.

In some embodiments, sensing the temperature comprises sensing the temperature of the fluid flowing in the fluid line of a Buffer Air Cooler.

In some embodiments, outputting the excess flow indication comprises outputting a message to an engine monitoring system, the message comprising instructions to cause at least one corrective action to be performed.

In some embodiments, the method further comprises starting a timer when the temperature is beyond the temperature threshold and detecting excess flow of the fluid in the fluid line when the timer exceeds a predetermined period of time.

In another aspect, there is provided a system for detecting excess fluid flow in an engine fluid system, the system comprising a fluid flow restrictor positioned upstream of a fluid line of the fluid system and downstream of a source of the fluid system, the fluid flow restrictor configured to receive a fluid from the source and to flow the fluid from the source into the fluid line, a temperature sensor positioned downstream of the fluid flow restrictor, the temperature sensor configured for sensing a temperature of the fluid flowing into the fluid line, and a processing unit configured to receive the temperature sensed by the temperature sensor, compare the temperature to a temperature threshold, and when the temperature is beyond the temperature threshold, detect excess flow of the fluid in the fluid line and output an excess flow indication accordingly.

In some embodiments, upon excess fluid flow being supplied into the fluid line, the fluid flow restrictor is configured to create a choked flow thereat and to cause a decrease in the temperature downstream of the fluid flow restrictor.

In some embodiments, the fluid flow restrictor is a venturi nozzle.

In some embodiments, the processing unit is configured to sense the decrease in the temperature downstream of the fluid flow restrictor.

In some embodiments, the fluid flow restrictor is positioned upstream of a primary fluid line of the fluid system.

In some embodiments, the fluid flow restrictor is positioned upstream of a secondary bypass fluid line of the fluid system, the secondary bypass fluid line parallel to a primary fluid line of the fluid system.

In some embodiments, the fluid flow restrictor is positioned upstream of the fluid line of a Buffer Air Cooler.

In some embodiments, the processing unit is configured to output the excess flow indication comprising outputting a message to an engine monitoring system, the message comprising instructions to cause at least one corrective action to be performed.

In some embodiments, the processing unit is configured to start a timer when the temperature is beyond the temperature threshold and detect excess fluid flow in the fluid line when the timer exceeds a predetermined period of time.

In a further aspect, there is provided a system for detecting excess fluid flow in an engine fluid system, the system comprising a processing unit, and a non-transitory memory communicatively coupled to the processing unit and comprising computer-readable program instructions executable by the processing unit for sensing a temperature of a fluid flowing in a fluid line of the fluid system, the fluid line located downstream of a fluid flow restrictor configured to receive the fluid from a source upstream thereof and to flow the fluid from the source into the fluid line downstream thereof, comparing the temperature to a temperature threshold, and when the temperature is beyond the temperature threshold, detecting excess flow of the fluid in the fluid line and outputting an excess flow indication accordingly.

DESCRIPTION OF THE DRAWINGS

Reference is now made to the accompanying figures in which.

DETAILED DESCRIPTION

Figure 1:
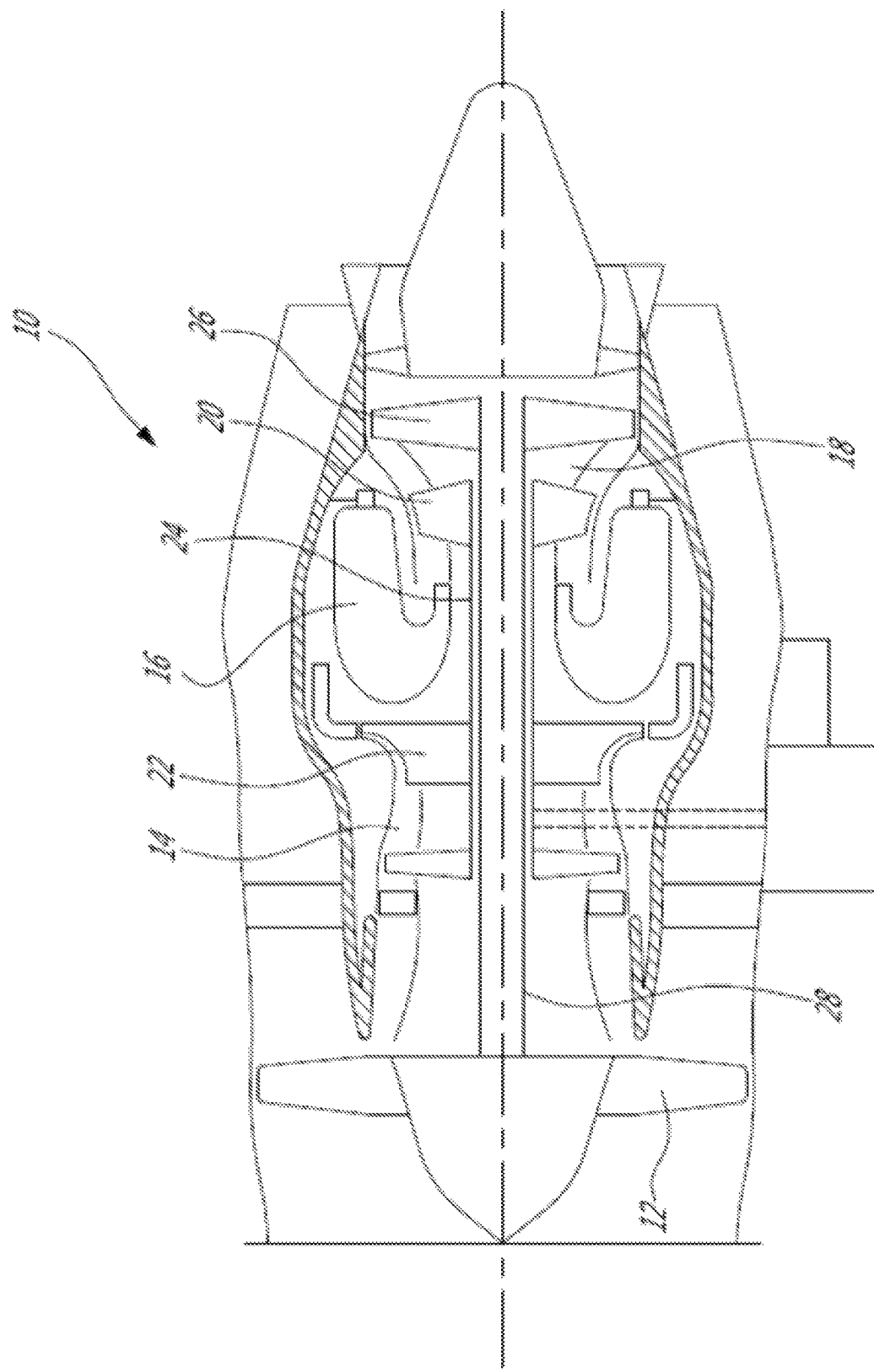
FIG. 1 is a schematic cross-sectional view of an example gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. Other types of aircraft engines and any other suitable types of engines (e.g., industrial engines, automotive engines, etc.) may also apply. Other examples of engines comprise, but are not limited to, auxiliary power units (APUs), rotary engines, electric engines, and hybrid electric propulsion systems having a propeller driven in a hybrid architecture (series, parallel, or series/parallel) or turboelectric architecture (turboelectric or partial turboelectric). The engine 10 may be for flight applications, industrial applications, or the like.

Figure 2A:
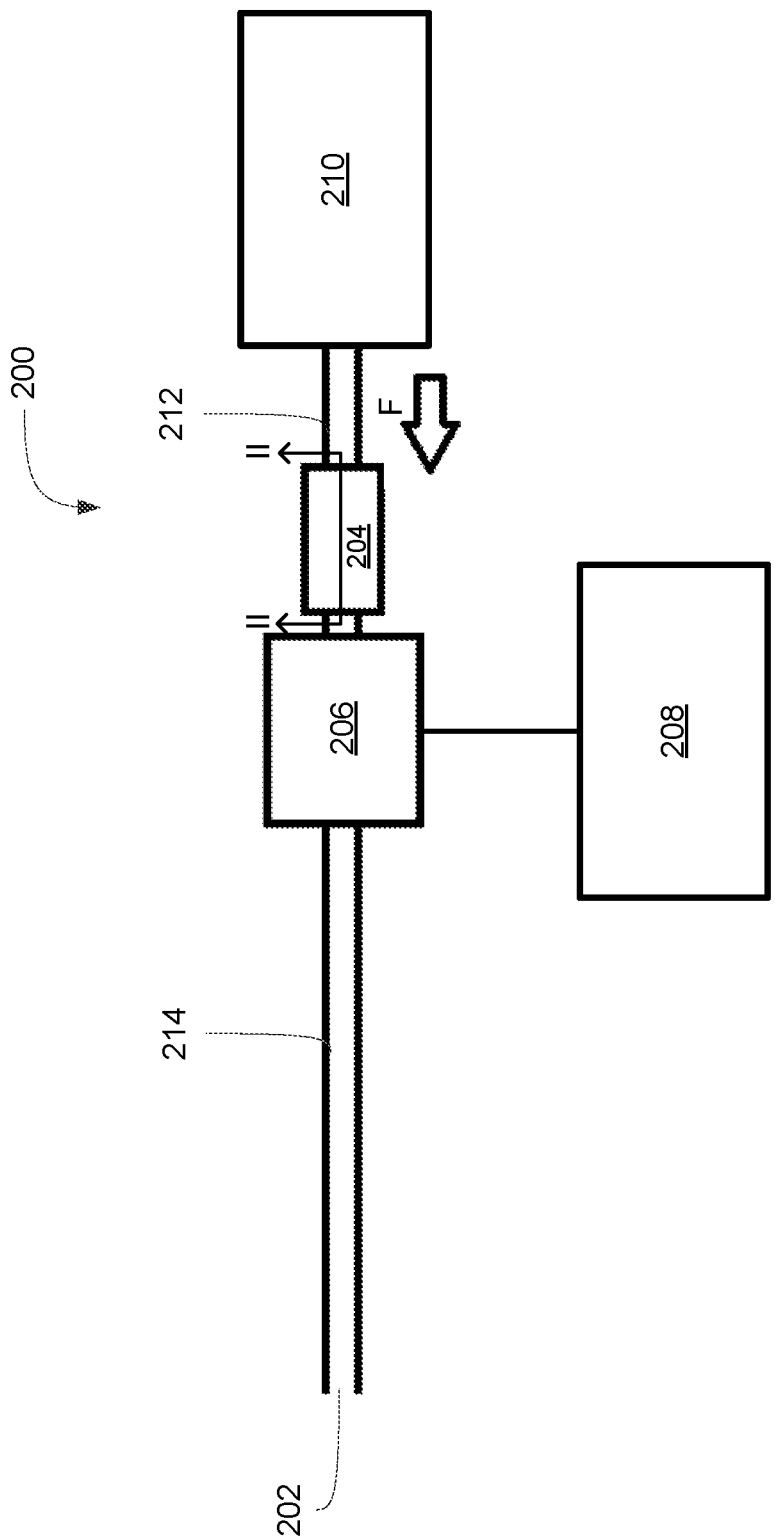
FIG. 2A is a schematic diagram of an example system for detecting excessive flow in a fluid system, in accordance with one embodiment.

With reference to FIG. 2A, an example system 200 for detecting excessive flow in a fluid system (e.g., that of an engine, such as engine 10 of FIG. 1) will now be described in accordance with one embodiment. As used herein, the term excessive (or excess) fluid flow refers to a flow of fluid that exceeds a usual flow of fluid that occurs under normal operating conditions. As used herein, the term excessive (or excess) fluid flow may thus refer to a fluid leakage (e.g., in an engine fluid system being monitored). While the system 200 is described and illustrated herein with reference to engine 10, it should be understood that this is for illustration purposes only and that any other suitable engine may apply, as discussed herein above. Accordingly, any suitable fluid system including, but not limited to an aircraft or engine pneumatic system, may apply. In one embodiment, the systems and methods described herein may be applied on-wing on aircraft engines, such as the engine 10, as well as on-ground for maintenance, assembly or test cell applications. Other embodiments may apply.

In one embodiment, the systems and methods described herein may be applied to the fluid line of a Buffer Air Cooler (BAC) (not shown). The BAC is an air-to-air heat exchanger that is located in a bypass air duct (not shown) of a turbofan gas turbine engine, such as engine 10 of FIG. 1. The BAC may be disposed downstream of the fan assembly and upstream of one of top dead center (TDC) fairings (not shown) of the engine 10. The BAC is in fluid communication with a compressor air source (not shown) in order to direct a compressor air flow to pass through the BAC in which the compressor air flow is cooled by the relatively cooler bypass air stream passing through the annular bypass air duct. The cooled compressor air flow may then be delivered to various locations (not shown) in the engine 10, such as bearing cavities or other hot turbine components, for cooling purposes. As will be described further below, an existing Buffer Air Cooler Temperature (BACT) sensor (not shown) may be used to detect the temperature of air downstream of the BAC and accordingly detect a failure in the BAC line (e.g., a break in the line, a disconnected or loose fluid fitting, or the like) which delivers pressurized air to a bearing seal of the BAC. A break in the BAC line would indeed be undesirable as it would result in insufficient air pressure at the bearing seal causing fluid to leak from the BAC. It should however be understood that the systems and methods described herein may be applied to a fluid system other than a BAC. As such, a temperature sensor may be used as proposed herein to detect failure in any disconnected fluid connections or broken engine fluid lines.

In the embodiment illustrated in FIG. 2A, the system 200 comprises a fluid line 202 of the engine's fluid system, a fluid flow restrictor 204, a temperature sensor 206 (e.g., a BACT sensor), and a detection unit 208. In the illustrated embodiment, a fluid F flows from a source 210, which is positioned upstream of the flow restrictor 204 and in fluid communication therewith, and into an upstream portion 212 of the fluid line 202. It should be noted that the fluid flow restrictor 204 may be an integral part of the fluid line 212. As used herein, the terms "upstream" and "downstream" are defined relative to a normal flow direction of the fluid F. The fluid F may be engine-bleed air or any suitable compressible mixture. In one embodiment, the source 210 is an engine-side pressure source of a bleed air system of the aircraft. The temperature sensor 206 may be part of existing sensors of the engine 10 or may be added to the engine 10 for the purposes of obtaining the measurement of the downstream temperature. As such, the temperature sensor 206 may be provided as part of the fluid system or may be external to the fluid system. In some embodiments, the detection unit 208 may be provided as part of the engine 10. In other embodiments, the detection unit 208 may be external to the engine 10. The detection unit 208 may be part of an Electronic Engine Control (EEC, not shown), which may be part of a Full Authority Digital Engine Control (FADEC, not shown) used to control the overall operation and performance of the engine 10.

The flow restrictor 204 may be installed at a location along the fluid line 202 that is readily accessible for visual inspection and servicing of the fluid line 202. In this embodiment, the fluid line 202 is typically located as close as possible to the source 210. In the embodiment of FIG. 2A, the upstream portion 212 of the fluid line 202 may be disposed between the source 210 and the flow restrictor 204, the latter located upstream of a remainder of the fluid line 202 where a potential failure would not be directly detectable. An input end or inlet (not shown) of the fluid flow restrictor 204 may then be fluidly connected to the upstream portion 212 of the fluid line 202 such that the fluid F flows into the inlet of the fluid flow restrictor 204. It should however be understood that, in some embodiments, the fluid F may flow directly from the source 210 into the inlet of the fluid flow restrictor 204. The fluid F then flows downstream of the fluid flow restrictor 204 and exits from an output end or outlet (not shown) of the fluid flow restrictor 204 and into a downstream portion 214 the fluid line 202 to which the outlet of the fluid flow restrictor 204 is fluidly coupled. In other words, the fluid flow restrictor 204 is fluidly coupled to the fluid line 202 (i.e. to the upstream and downstream portions 212, 214 thereof) and is as such positioned along the flow path of the fluid F.

It should be understood that the location of the fluid flow restrictor 204 may depend on various factors including, but not limited to, the length of the fluid line 202, the configuration of the fluid line supports, the location of weld lines along the fluid line 202, pressure of the fluid F and associated losses, and maintenance access. In one embodiment, the location of the fluid flow restrictor 204 may be chosen based on such factors and the fluid flow restrictor 204 may therefore be located at any suitable position along the length of the fluid line 202. Using the systems and methods described herein allows for failures in the downstream portion 214 of the fluid line 202 to be detected (i.e. no failures in the upstream portion 212 of the fluid line 202 may be detected). The fluid flow restrictor 204 may therefore be positioned as close as possible to the source 210. However, as discussed above, it should be understood that the fluid flow restrictor 204 may not always be placed directly at an outlet of the source 210. In some embodiments, the fluid flow restrictor 204 may be positioned further away from the source 210 if the area of concern (i.e. the area where a break in the fluid line 202 may occur) is remote from the source 210.

The temperature sensor 206 is in turn positioned downstream of the fluid flow restrictor 204 and is connected to the downstream portion 214 of the fluid line 202. The temperature sensor 206 is configured to measure a temperature (referred to herein as a 'downstream temperature') of the fluid (e.g., air in the case of a BACT sensor) flowing into the fluid line 202, downstream of the fluid flow restrictor 204. The temperature sensor 206 then produces one or more sensor signals, which are indicative of the downstream temperature measurement. The sensor signal(s), which can be electrical signal(s), digital or analog, DC or AC, or any other suitable type of signal(s), are transmitted to or otherwise received by the detection unit 208. The detection unit 208 is in turn configured to detect excessive fluid flow (or leakage) in the engine's fluid system in the manner described further below. As will be discussed further below, in the event of a downstream failure (i.e. excessive fluid flow) in the fluid line 202, the fluid flow restrictor 204 provided upstream of the temperature sensor 206 is configured to create a change in temperature in the downstream portion 214 of the fluid line 202. The change in temperature can then be detected by the temperature sensor 206 for the purpose of detecting excessive flow in the fluid line 202, which is in turn indicative of an abnormality in the operation of the fluid system (i.e. a potential failure of the fluid line 202).

Figure 2B:
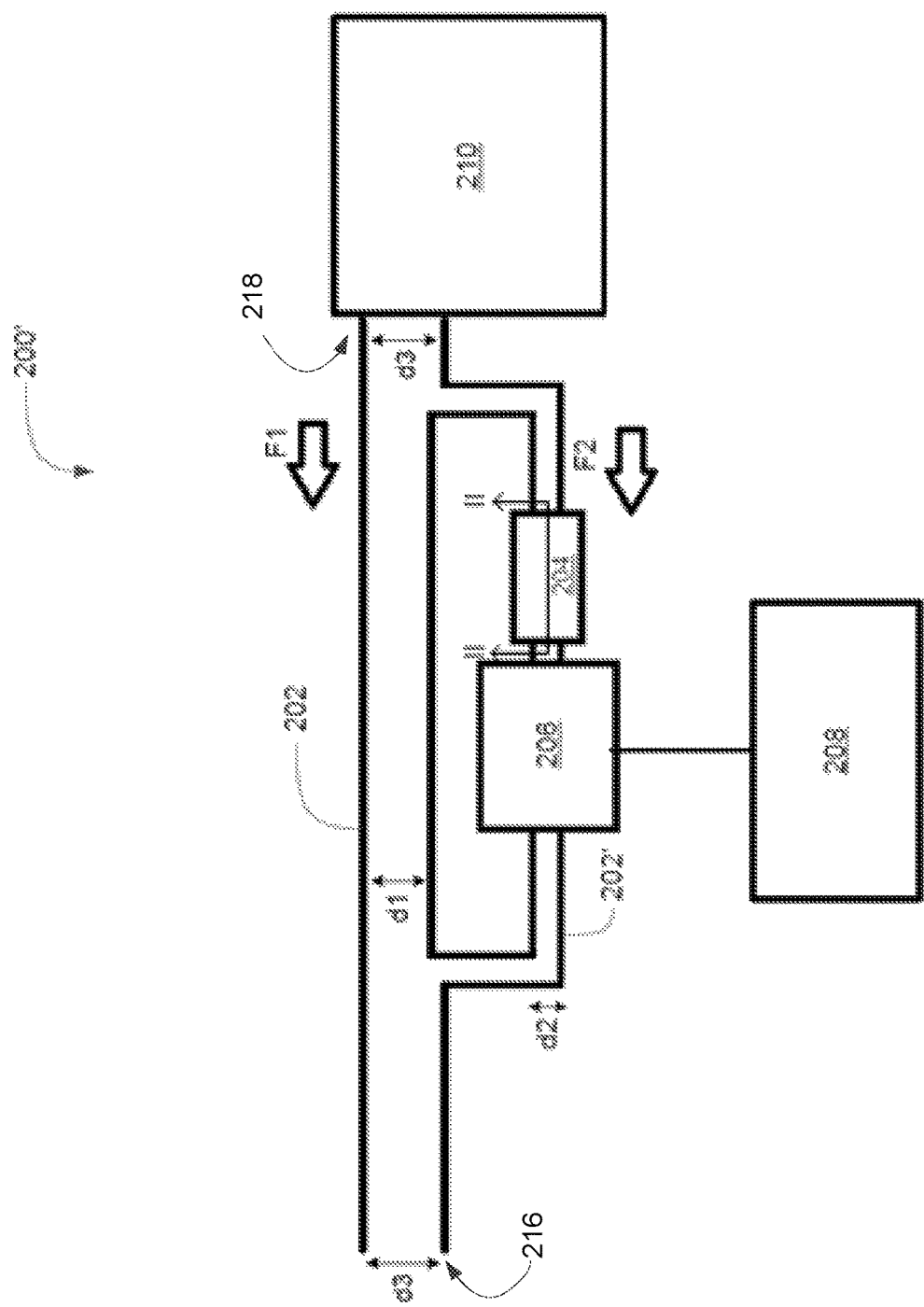
FIG. 2B is a schematic diagram of an example system for detecting excessive flow in a fluid system, in accordance with another embodiment.

Although FIG. 2A illustrates an embodiment where the fluid flow restrictor 204 and the temperature sensor 206 are provided in a primary fluid line 202, it should be understood that, depending on the application and on engine configuration, the fluid flow restrictor 204 and the temperature sensor 206 may be provided at different locations. Indeed, the fluid flow restrictor 204 and the temperature sensor 206 may be provided in order to allow for the primary fluid line to be operated in a typical manner. FIG. 2B illustrates an example system 200' for detecting excessive flow in a fluid system in accordance with such an alternate embodiment.

Figure 2C:
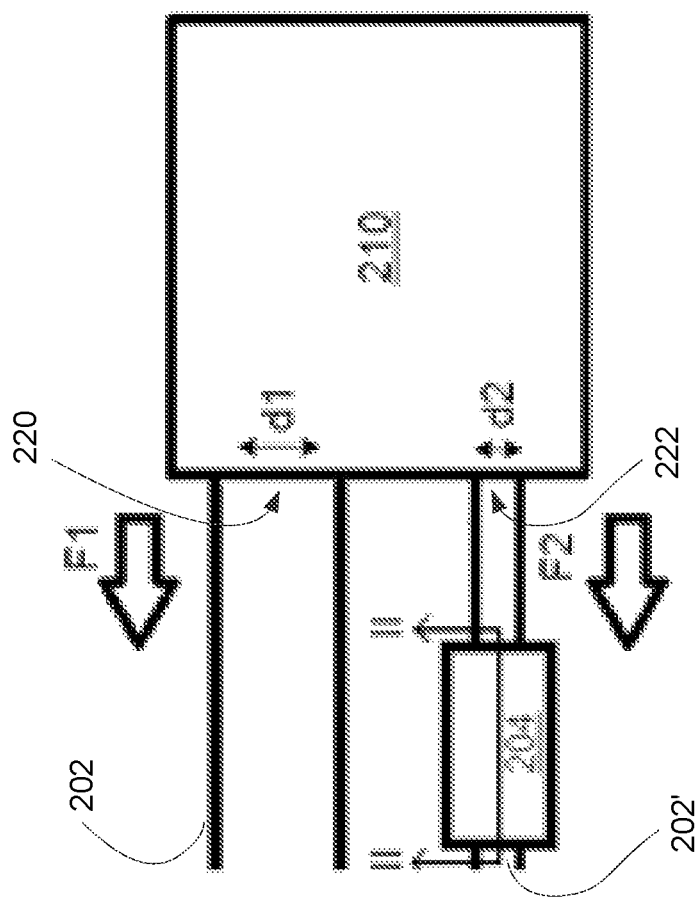
FIG. 2C is a schematic diagram of an inlet for use with the example system of FIG. 2B, in accordance with another embodiment.

The system 200' of FIG. 2B comprises a first fluid line 202 and a second fluid line 202' parallel to the first fluid line 202. The first fluid line 202 (referred to herein as a 'primary' fluid line) is illustratively sized according to system requirements and may have a diameter d1 that is greater than a diameter d2 of the second fluid line 202 (referred to herein as a 'secondary' or 'bypass' fluid line). In one embodiment, the diameter d1 is also smaller than a diameter d3 at the end 216 of the fluid line 202. In one embodiment shown in FIG. 2B, fluid may be supplied into the primary and secondary fluid lines 202, 202' through a common fluid inlet 218 having a diameter d3 substantially equal to that of the end 216. In another embodiment shown in FIG. 2C, fluid may be supplied into the fluid lines 202, 202' through two separate inlets 220, 222 having diameters d1 and d2, respectively.

Referring back to FIG. 2B, the fluid flow restrictor 204 and the temperature sensor 206, are positioned in the secondary fluid line 202'. A first stream F1 of fluid (from the source 210) flows into the primary fluid line 202 and a second (or parallel) stream F2 of fluid flows into the fluid flow restrictor 204 and downstream of the fluid flow restrictor 204 into the secondary fluid line 202'. The primary fluid line 202 may be used in normal operation and configured to receive the first (or 'main') fluid stream F1 while the secondary fluid line 202' may be used for fluid leakage detection (i.e. to detect leakage caused by the second fluid stream F2). For this purpose, the temperature sensor 206 positioned downstream of the fluid flow restrictor 204 measures the temperature of the fluid stream F2 flowing into the secondary fluid line 202' positioned downstream of the fluid flow restrictor 204. The temperature sensor 206 then provides the temperature measurement to the detection unit 208, which is configured to detect a failure (i.e. excessive fluid flow) in the engine's fluid system in the manner described further below.

In some embodiments, a flow control means, such as a valve (not shown), may be employed in the fluid system. The flow control means may, when activated, block fluid flow in the primary fluid line 202 when there is a failure in the primary fluid line 202, in order to increase fluid flow in the secondary fluid line 202'. The valve may be any suitable valve or other means of flow control including, but not limited to, a check valve, a ball valve, and a spring-actuated valve.

Figure 3:
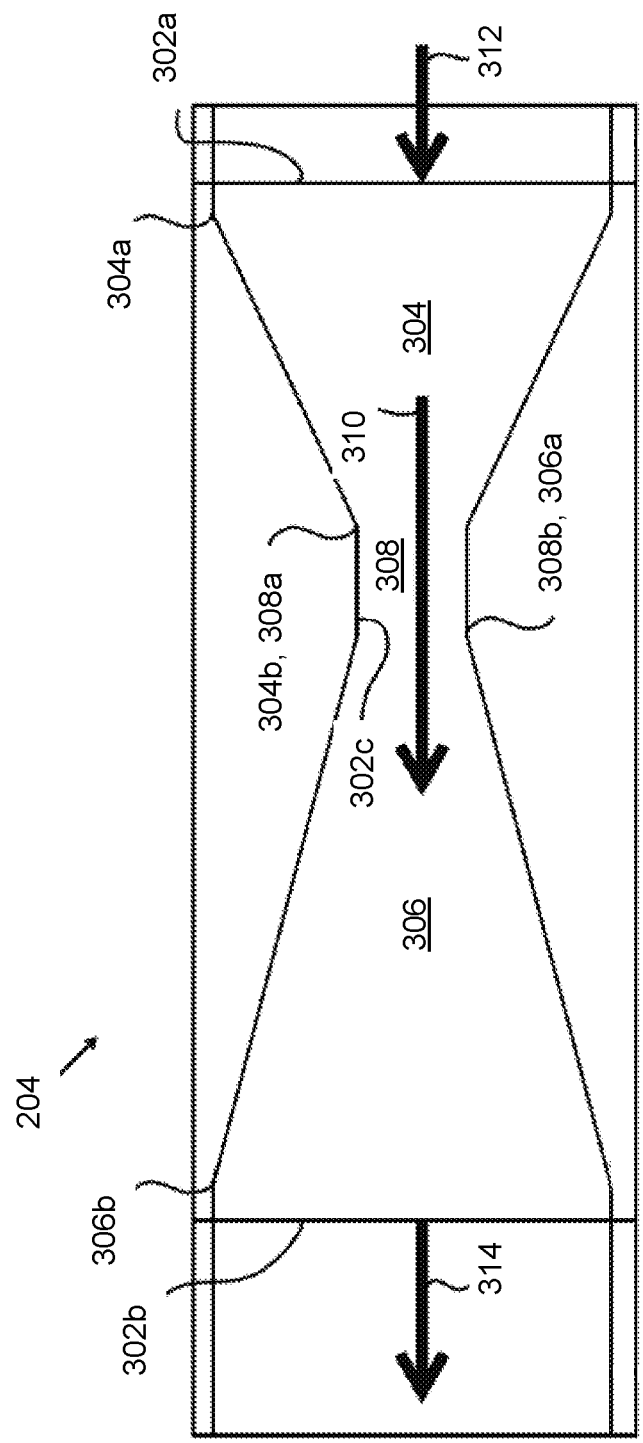
FIG. 3 is a cross-sectional view of the fluid flow restrictor of FIG. 2A, FIG. 2B, and FIG. 2C, taken along line II-II of FIG. 2A, FIG. 2B, and FIG. 2C.

Referring now to FIG. 3, in one embodiment, the fluid flow restrictor 204 is a nozzle (e.g. a venturi nozzle). It should however be understood that any suitable mechanism for restricting fluid other than a nozzle (e.g., one or more orifices, or the like) may apply. In this embodiment, the fluid flow restrictor 204 has an interior extending between the inlet 302a connected to the source 210 and the outlet 302b connected to the fluid line 202. The interior of the fluid flow restrictor 204 is surrounded by a peripheral wall 302c. At the inlet and at the outlet, the peripheral wall 302c defines an inner diameter corresponding to that of the fluid line 202. The peripheral wall 302c is shaped so as to define a converging section (i.e., a contraction 304), a diverging section (i.e., a diffuser 306) and a throat 308 of the fluid flow restrictor 204 between the contraction 304 and the diffuser 306. The contraction 304 has an upstream end 304a proximate the inlet 302a, and a downstream end 304b spaced away therefrom. The contraction 304 narrows down as it extends from its upstream end 304a to its downstream end 304b. The diffuser 306 has a downstream end 306b proximate the outlet 302b and an upstream end 306a spaced away therefrom. The diffuser 306 broadens as it extends from its upstream end 306a to its downstream end 306b. In this embodiment, both the contraction 304 and the diffuser 306 have continuously tapered shapes, although of different taper angles. In yet other embodiments, the contraction 304 and the diffuser 306 may respectively be formed of a plurality of portions tapering at different taper angles.

The throat 308 is an interface between the contraction 304 and the diffuser 306 defining a choke orifice, i.e., an orifice having a smallest diameter formed by the peripheral wall 302c. In this embodiment, the contraction 304 and the diffuser 306 are spaced away from one another such that the throat 308 has a straight, cylindrical shape. The throat 308 thus has an upstream end 308a contiguous with the downstream end 304b of the contraction 304, and a downstream end 308b contiguous with the upstream end 306a of the diffuser 306. In other embodiments, the throat 308 may otherwise form a continuously curved transition between the contraction 304 and the diffuser 306, such that the peripheral wall 302c has an hourglass shape.

In operation, the source 210 is configured to provide a flow of pressurized fluid via the fluid line 202. In the embodiment where the fluid flow restrictor 204 is a venturi as illustrated in FIG. 2B, inside the fluid flow restrictor 204, the flow may be described as a venturi flow 310 having a venturi velocity (not shown) and a venturi pressure (not shown) that may vary across the length of the fluid flow restrictor 204. As mentioned above, in one embodiment, the fluid flow restrictor 204 may be disposed downstream of the source 210 yet proximate thereto, such that the flow upstream of the fluid flow restrictor 204 can be described as source flow 312. Conversely, the flow downstream of the fluid flow restrictor 204 (i.e., into the downstream portion 214 of the fluid line 202) can be described as a line flow 314. The fluid flow restrictor 204 is configured to impart the line flow 314 with certain property values that may vary based on those of the source flow 312 received by the fluid flow restrictor 204.

For instance, absent any excessive flow in the fluid line 202 (i.e. under normal operating conditions), the source flow 312 may be described as a nominal source flow (i.e., a flow having properties corresponding to those of the nominal flow), and the venturi flow 310 may be described as a nominal venturi flow. Under normal operating conditions, the fluid flow restrictor 204 is configured so that, upon receiving the nominal source flow, the venturi velocity accelerates in the contraction 304 from a nominal velocity value to a first value and decelerates in the diffuser 306 back to the nominal velocity value such that a nominal line flow downstream of the fluid flow restrictor 204 has a nominal line velocity and a nominal line pressure corresponding to those upstream of the fluid flow restrictor 204. In the fluid flow restrictor 204, the venturi pressure decreases in the contraction 304 to a reduced pressure value less than the nominal pressure value, and increases in the diffuser 306 so as to recover the nominal pressure value.

On the other hand, upon excessive fluid being supplied from the source 210 to the downstream portion 214 of the fluid line 202, the fluid flow restrictor 204 induces a different effect on the fluid conveyed therein. Under such conditions, the fluid flow restrictor 204 is configured to create a decrease in pressure downstream of the fluid flow restrictor 204. The pressure decrease, which is illustratively due to the break in the fluid line 202, causes the higher pressure fluid in the fluid line 202 to flow to the lower pressure zone outside of the fluid line 202. In particular, in the fluid flow restrictor 204, the venturi pressure decreases (e.g., from the nominal pressure value) in the contraction 304, and further decreases in the diffuser 306. Hence, the pressure in the fluid line 202 decreases from the nominal pressure value to a reduced pressure value. The high pressure fluid F is in turn caused to flow towards the low pressure zone (not shown), creating choked flow at the fluid flow restrictor 204 and causing a decrease in temperature downstream of the fluid flow restrictor 204. This temperature decrease can then be detected by the temperature sensor 206 and used by the detection unit 208 to detect abnormal operation of the engine's fluid system (i.e. excessive fluid flow).

Figure 4:
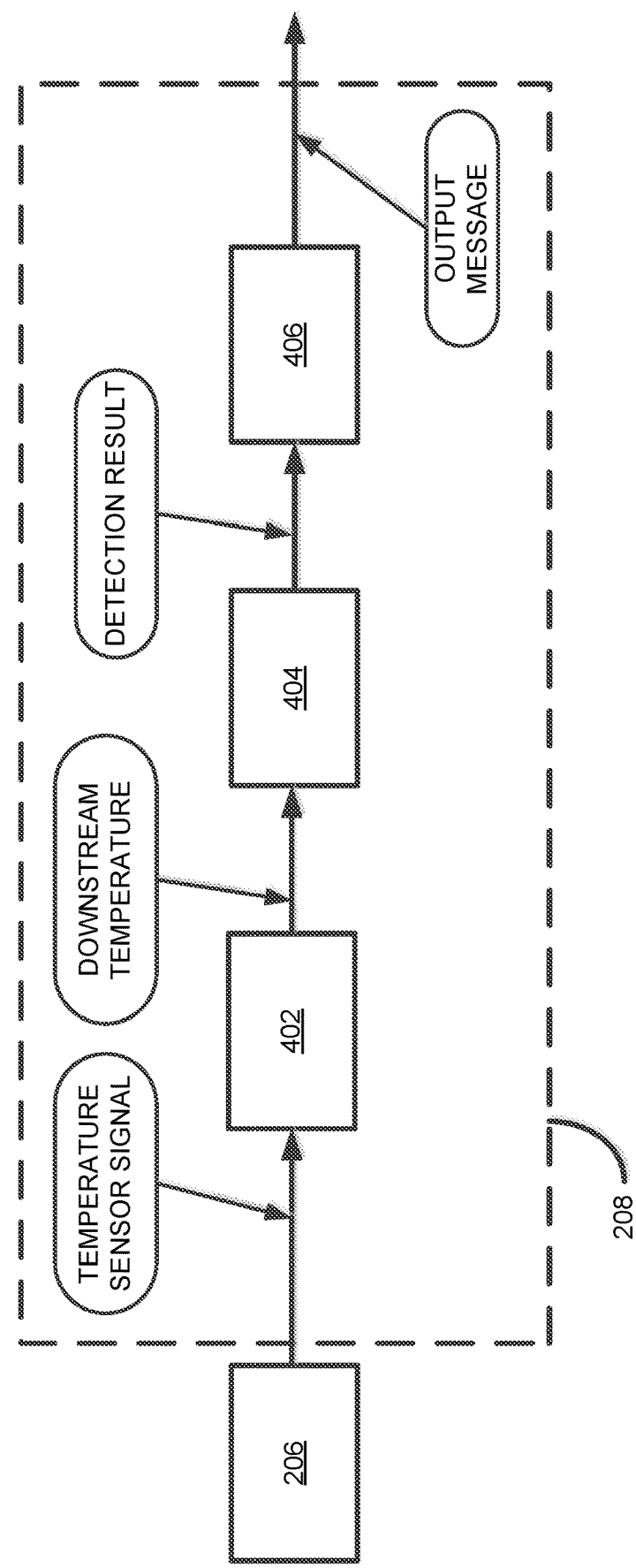
FIG. 4 is a schematic diagram showing the excessive flow detection unit of FIG. 2A, FIG. 2B, and FIG. 2C, in accordance with one embodiment.

Referring now to FIG. 4, in one embodiment, the detection unit 208 comprises an input unit 402, an excessive flow detection unit 404, and an output unit 406. The input unit 402 is configured to receive from the temperature sensor 206 one or more sensor signals indicative of the downstream temperature measurement. The input unit 402 is further configured to send the downstream temperature measurement to the excessive flow detection unit 404. The temperature sensor 206 provides a temperature which is compared at the excessive flow detection unit 404 to a temperature threshold. The temperature threshold may be specific to the engine operating condition and/or setpoint. For example, the fluid temperature may differ at ground idle versus cruise and the temperature threshold may be determined accordingly. In some embodiments, the excessive flow detection unit 404 may obtain the temperature threshold by querying one or more lookup tables, based on the engine setpoint. It should however be understood that the temperature threshold may be obtained without resorting to the lookup table(s). In one embodiment, if the excessive flow detection unit 404 determines that the downstream temperature is beyond the temperature threshold for a specified amount of time (e.g. ten (10) seconds or more), a fault is triggered and one or more corresponding fault signals are output by the excessive flow detection unit 404.

As previously mentioned, due to the fluid flow restrictor 204, a decrease in temperature downstream of the fluid restrictor 204 will occur and the temperature change will be sensed by the temperature sensor 206. In order to determine whether the fault is indeed a break in the fluid line 202, the excessive flow detection unit 404 triggers the fault when the downstream temperature exceeds a lower temperature limit. It should be understood that, in one embodiment, comparison of the downstream temperature to a higher (rather than to a lower) temperature limit could indicate a malfunction of the BAC. If the downstream temperature is below the threshold (i.e. below the lower temperature limit, within a predetermined tolerance that will vary depending on engine configuration), the downstream temperature is considered to be beyond the threshold and the fault is triggered. Thus, in one embodiment, the term 'beyond' as used herein refers to a downstream temperature that is below a lower temperature limit or threshold, within a predetermined tolerance. It should however be understood that, in some embodiments, the temperature threshold may be a range having both a lower temperature limit and an upper temperature limit. In this case, the term 'beyond' as used herein refers to a downstream temperature that falls outside the temperature range, i.e. is below the lower temperature limit or above the upper temperature limit (within a predetermined tolerance).

In some embodiments, upon the fault being triggered and upon the fault signal(s) being received from the excessive flow detection unit 404, the output unit 406 generates an output message (e.g. an alert or excess flow indication) indicative of the fault (i.e. excessive flow in the engine's fluid system). The output message may comprise instructions for causing one or more corrective actions (e.g., inspection and verification of the fluid line 202 using other aircraft fault detection systems) to be performed (e.g., by an on-ground maintenance team). The output message may be transmitted (using any suitable transmission means) to a monitoring system of the engine and/or the aircraft, display elements of which may be located in the cockpit of the aircraft. The output message may then be rendered via a suitable output device, such as the display elements or the like, in order to bring the fluid system failure to the attention of aircraft personnel and allow timely initiation of corrective action.

In some embodiments, the excessive flow detection unit 304 may be configured to use a timer in order to distinguish the excessive flow condition from a transient condition. For this purpose, the excessive flow detection unit 304 may start the timer when the temperature is beyond the temperature threshold. The excessive flow detection unit 304 may then detect the excessive flow condition when the timer exceeds a predetermined period of time. The timer would be reset if the temperature drops below the temperature threshold before the timer exceeds the predetermined period of time.

Figure 5:
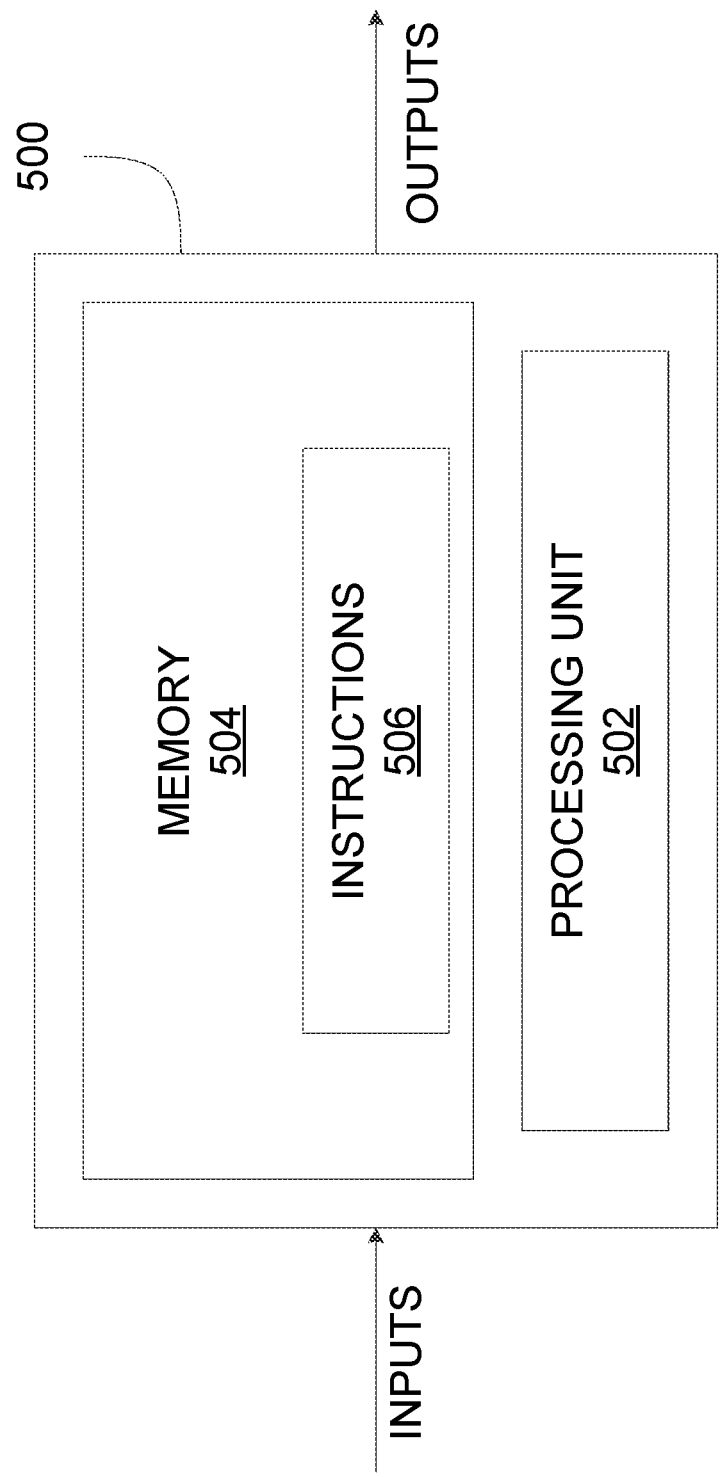
FIG. 5 is a block diagram of an example computing system for implementing the excessive flow detection unit of FIG. 4, in accordance with an embodiment.

FIG. 5 is an example embodiment of a computing device 500 for implementing the detection unit 208 described above with reference to FIG. 4. The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause the functions/acts/steps specified in the method described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

Figure 6:
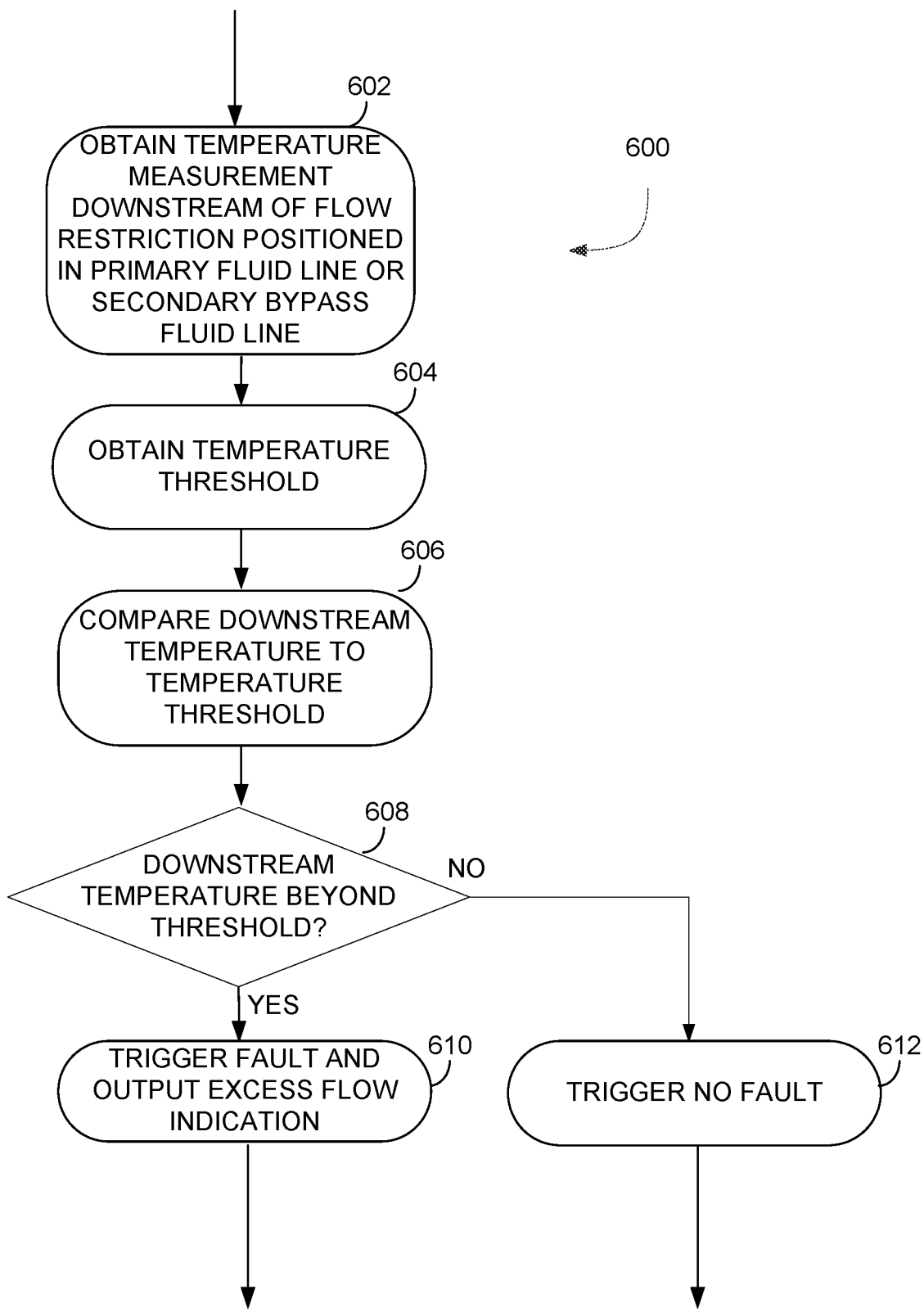
FIG. 6 is a flowchart of a method for detecting excessive flow in a fluid system, in accordance with one embodiment.

Referring to FIG. 6, an example method 600 for detecting excessive flow in a fluid system, such as that of the engine 10 of FIG. 1, will now be described. While the method 600 is described herein with reference to the engine 10 of FIG. 1, this is for example purposes only. The method 600 may be applied to any suitable engine and/or to any suitable fluid system. The method 600 may be implemented by the computing device 500 of FIG. 5.

At step 602, a measurement of a temperature downstream of a flow restriction (e.g. a nozzle or the like) positioned in a primary or a secondary bypass fluid line of a fluid system is obtained, e.g. using a temperature sensor positioned downstream of the flow restriction. The next step 604 is then to obtain a temperature threshold for use in detecting excessive fluid flow in the fluid system. In one embodiment, the temperature threshold is obtained using one or more lookup tables, based on the engine setpoint, as described herein above. The temperature downstream of the flow restriction is then compared to the temperature threshold at step 606. The next step 608 is then to determine whether the downstream temperature is beyond (e.g. below) the temperature threshold. If this is the case, abnormal operation of the fluid system (i.e. excessive fluid flow in the primary or secondary bypass fluid line) is detected and a fault is triggered accordingly (step 610). An excess flow indication (e.g., an output message indicative of the excess fluid flow in the fluid line) is also illustratively output at step 610. The excess flow indication may be output to a suitable output device (e.g., display elements of a monitoring system of the engine and/or the aircraft, or the like) for causing an appropriate corrective action to be performed. Otherwise, if the downstream temperature is not beyond the temperature threshold, normal operation of the fluid system is determined and no fault is triggered (step 612).

In some embodiments, the systems and methods described herein may provide for effective detection of maintenance errors and components failures. The systems and methods described herein may indeed enable for existing temperature sensor(s) to be used in combination with a fluid flow restrictor in order to achieve dual functionality of the temperature sensor (i.e. temperature measurement and excessive flow detection). This may in turn provide a less complex and more cost effective solution compared to adding a pressure sensor in the fluid system for the purpose of monitoring fluid flow and detecting abnormal operation of the fluid system.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for detecting excess flow in an engine fluid system, the method comprising: sensing a temperature of a fluid flowing in a fluid line of the fluid system, the fluid line located downstream of a fluid flow restrictor configured to receive the fluid from a source upstream thereof and to flow the fluid from the source into the fluid line downstream thereof, the fluid flow restrictor being a venturi nozzle configured to create a choked flow thereat and configured to cause a decrease in the temperature downstream of the fluid flow restrictor upon excess fluid flow being supplied into the fluid line; comparing the temperature to a temperature threshold; and when the temperature is beyond the temperature threshold, detecting excess flow of the fluid in the fluid line and outputting an excess flow indication.

2. The method of claim 1, wherein sensing the temperature comprises sensing the decrease in the temperature downstream of the fluid flow restrictor.

3. The method of claim 1, wherein sensing the temperature comprises obtaining a measurement of the temperature from a temperature sensor positioned downstream of the fluid flow restrictor.

4. The method of claim 1, wherein sensing the temperature comprises sensing the temperature of the fluid flowing in a primary fluid line of the fluid system.

5. The method of claim 1, wherein sensing the temperature comprises sensing the temperature of the fluid flowing in a secondary bypass fluid line of the fluid system, the secondary bypass fluid line parallel to a primary fluid line of the fluid system.

6. The method of claim 1, wherein sensing the temperature comprises obtaining a measurement of the temperature from a Buffer Air Cooler temperature sensor.

7. The method of claim 1, wherein outputting the excess flow indication comprises outputting a message to an engine monitoring system, the message comprising instructions to cause at least one corrective action to be performed.

8. The method of claim 1, further comprising starting a timer when the temperature is beyond the temperature threshold and detecting excess flow of the fluid in the fluid line when the timer exceeds a predetermined period of time.

9. A system for detecting excess fluid flow in an engine fluid system, the system comprising: a fluid flow restrictor positioned upstream of a fluid line of the fluid system and downstream of a source of the fluid system, the fluid flow restrictor configured to receive a fluid from the source and to flow the fluid from the source into the fluid line, the fluid flow restrictor being a venturi nozzle configured to create a choked flow thereat and configured to cause a decrease in the temperature downstream of the fluid flow restrictor upon excess fluid flow being supplied into the fluid line; a temperature sensor positioned downstream of the fluid flow restrictor, the temperature sensor configured for sensing a temperature of the fluid flowing into the fluid line; and a processing unit configured to: receive the temperature sensed by the temperature sensor; compare the temperature to a temperature threshold; and when the temperature is beyond the temperature threshold, detect excess flow of the fluid in the fluid line and output an excess flow indication.

10. The system of claim 9, wherein the processing unit is configured to sense the decrease in the temperature downstream of the fluid flow restrictor.

11. The system of claim 9, wherein the fluid flow restrictor is positioned upstream of a primary fluid line of the fluid system.

12. The system of claim 9, wherein the fluid flow restrictor is positioned upstream of a secondary bypass fluid line of the fluid system, the secondary bypass fluid line parallel to a primary fluid line of the fluid system.

13. The system of claim 9, wherein the temperature sensor is a Buffer Air Cooler temperature sensor.

14. The system of claim 9, wherein the processing unit is configured to output the excess flow indication comprising outputting a message to an engine monitoring system, the message comprising instructions to cause at least one corrective action to be performed.

15. The system of claim 9, wherein the processing unit is configured to start a timer when the temperature is beyond the temperature threshold and detect excess fluid flow in the fluid line when the timer exceeds a predetermined period of time.

16. A system for detecting excess fluid flow in an engine fluid system, the system comprising: a processing unit; and a non-transitory memory communicatively coupled to the processing unit and comprising computer-readable program instructions executable by the processing unit for: sensing a temperature of a fluid flowing in a fluid line of the fluid system, the fluid line located downstream of a fluid flow restrictor configured to receive the fluid from a source upstream thereof and to flow the fluid from the source into the fluid line downstream thereof, the fluid flow restrictor being a venturi nozzle configured to create a choked flow thereat and configured to cause a decrease in the temperature downstream of the fluid flow restrictor upon excess fluid flow being supplied into the fluid line; comparing the temperature to a temperature threshold; and when the temperature is beyond the temperature threshold, detecting excess flow of the fluid in the fluid line and outputting an excess flow indication.

* * * * *